United States Patent Office 2,796,813
Patented June 25, 1957

2,796,813

PROTECTIVE HOUSING FOR PHOTOGRAPHIC CAMERAS

Willi Michaelis, Braunschweig, Germany, assignor to Franke & Heidecke, Fabrik Photographischer Prazisions-Apparate, Braunschweig, Germany, a German firm Application June 28, 1954, Serial No. 439,833

Claims priority, application Germany July 2, 1953

7 Claims. (Cl. 95—11)

The invention relates to a protective housing construction adapting conventional photographic cameras for underwater photography, and particularly to a removable protective housing having means for actuating the camera film winding means in its intended manner while at the same time operating an auxiliary exposure counter.

In accommodating a conventional camera for submarine photography, it is essential that the housing be water-tight construction, yet at the same time allow the various camera mechanisms to function in their normal and intended manner while the camera remains submerged. In addition, underwater conditions greatly limit the operator's visibility so that even if the watertight housing is provided with a window opposite the film counter or film position indicator, it is rather difficult to read the small numerals through this window. It is therefore desirable to provide a protective housing having enlarged exposure counter means separate from but synchronized with the camera exposure counter to aid the photographer with his operations. Accordingly, it is an object of this invention to provide a new or generally improved and more satisfactory camera protective housing, and especially one having provision for easy reading of an exposure counter or film position indicator.

Another object is the provision of a camera protective housing having simple and satisfactory actuating means for operating the film winding mechanism of an enclosed camera in its normal and intended manner.

Still another object is to provide a protective housing having externally accessible actuating means which the operator may control by the sense of touch, for operating the film winding means of the camera within the housing.

A further object of the invention is to provide a protective housing having exposure counter means of enlarged and easily visible construction which is operated automatically by film winding means of the housing and which is synchronized with but separate from the normal exposure counter of the camera.

A still further object is the provision of a protective housing having an exposure counter which is moved in one direction automatically by a two step swinging actuation of the housing film winding means.

These and other desirable objects may be attained in the manner disclosed as an illustrative embodiment of the invention in the following description and in the accompanying drawings forming a part hereof, in which.

The housing of the present invention is designed especially but not exclusively for use with cameras of the twin lens reflex type, such as the well known "Rolleiflex" camera manufactured by the firm of Franke & Heidecke in Germany and widely used in many countries, including the United States. Current models of this camera have, on the right hand side of the camera body, a crank which is turned to advance the film to the next exposure area or frame, and concomitantly to tension the shutter for the next exposure. This construction is well understood in the art, is disclosed in the book "Rollei Photography" by Jacob Deschin (published 1952 by Camera Craft Publishing Company, San Francisco), and the details of one form of such construction are disclosed also in the W. Muller et al. Patent 2,148,636.

In accordance with the present invention, the photographic camera is enclosed within a water-tight protective housing or casing, so that photographs may be taken under water. This housing must, of course, be provided with externally accessible actuating or manipulating means to enable proper operation of the camera enclosed within the housing. The present invention deals especially with the means for operating the above-mentioned film winding and shutter tensioning handle or crank, and with readily visible means for indicating the film position or counting the exposures.

Figure 1:
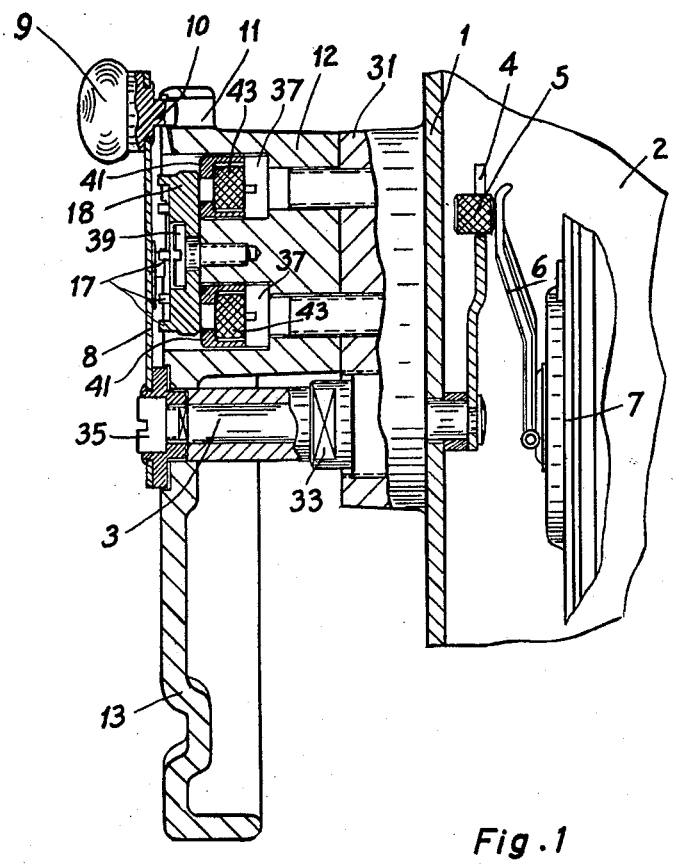
Fig. 1 is a vertical section through a portion of the film winding means of the protective housing showing its connection with an enclosed camera disclosed in part.

Referring now to Fig. 1 of the drawings, a fragment of the housing wall is shown at 1 and 2, and it will be understood that this housing completely encloses, in watertight manner, the camera itself, which may be a "Rolleiflex" camera, a fragment of which is shown at 7. This housing is, of course, provided with a transparent window in its front wall, alined with the camera lens and finder lens, and is also provided with externally accessible manipulating means for operating the focusing mechanism, the shutter trigger, the shutter speed control, the diaphragm aperture control, and so forth, but these parts are not shown in the present drawings because the details thereof are not important to the present invention. The details may be constructed, for example, in the manner disclosed in the United States patent application of Richard Weiss, Serial No. 440,198, filed June 29, 1954, and based upon patent application No. F12,235 filed July 1, 1953, in the German Federal Republic.

The wall 1 of the protective housing 2 adjacent the camera film winding means has an integral outwardly disposed projection 31 through which extends a rotatable shaft 3, with a tubular member surrounding the shaft 3 and suitable packing 33 between the shaft and the projection to prevent the entrance of water. On the inner end of the shaft 3 (the end nearest the camera) is rigidly secured an arm or lever 4 having a notched or cut-out portion on its free end forming a fork in which is disposed the actuating knob 5 of the film winding and shutter tensioning crank 6 of the camera 7. To the opposite or outer end of the shaft 3 is fixed, by suitable screw means 35, an operating arm or crank 8, which is in alinement with the lever 4, and thus a rotation of the crank 8 causes a like movement of the lever 4. On the free end of the crank 8 is provided a turning knob 9, the shank of which passes through the crank 8 and forms a pin or stud 10 extending toward the housing 2. The crank arm 8 is slightly resilient for flexure in a direction parallel to the shaft 3, so that the knob 9 may be displaced outwardly in a direction away from the camera and so that the pin 10 will tend to snap into and seat itself in a bore 11 formed in the housing attachment 12, when the pin comes opposite this bore during rotation of the crank. The housing attachment 12 is fixed to the housing projection 31 by suitable screws 37 passing through the attachment 12 and threaded into the projection 31 of the protective housing. To facilitate ease of handling, a supporting handle 13 is formed integral with the housing attachment 12. On opposite sides of the bore 11 the housing part 12 is formed with inclined cam surfaces 14 which displace the stud 10 away from the housing wall 1 as the stud nears the bore 11 during rotation of the crank, until the stud snaps into the bore 11 when the crank 8 reaches its rest position.

On the side of the crank 8 nearest the housing 2 are a pair of elongated camming projections 15 and 16, inclined in opposite directions with respect to the longitudinal axis of the crank 8. The projections 15 and 16, as hereafter described, are adapted to engage with the pins 17 for turning an exposure counter indicator or disk 18 which is rotatably mounted on the attachment 12 by a central screw member 39. The pins 17 are integrally formed on and project from the outer face of the disk 18, with each pin 17 being located adjacent to a number or graduation on the exposure disk scale 19. On the surface of the housing attachment 12 adjacent the periphery of the disk 18 is a fixed index mark 20 which cooperates with the graduations on the scale 19 to indicate visually the number of exposures made. Although the known camera constructions, such as disclosed by the W. Muller et al. patent heretofore mentioned, incorporate an exposure counter, the utility of such a counter in under water photography where the visibility of the operator is limited, has been found to be unsatisfactory and therefore an enlarged auxiliary counter which is in synchronization with the camera exposure counter is desirable.

Figure 2:
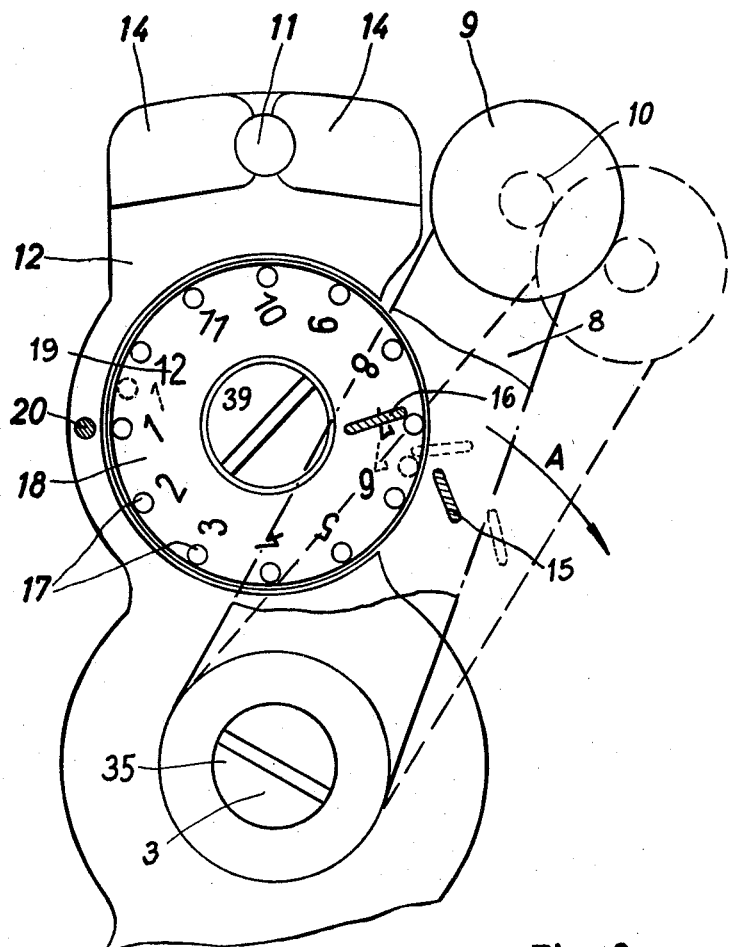
Fig. 2 is a partial side elevation illustrating the cooperation and positions of the various exposure counter and film winding elements of the housing during one step of the two step operation of the housing film winding means.

In operating the camera film winding handle 6 through the lever 4, shaft 3, and crank 8, the actuating knob 9 of the crank 8 is first pulled by the operator in a direction away from the protective housing to release the stud 10 from the bore 11, and the crank 8 is then rotated clockwise as shown by the arrow A in Fig. 2. During this movement of the crank 8 from rest position toward its extreme or limit position (as determined by the film measuring mechanism, see said Patent 2,148,636) the lower surface of the camming projection 16 engages with the periphery of a pin 17 (the pin adjacent the scale graduation 7 in Fig. 2) causing the engaged pin 17 to move downwardly and thus impart a clockwise rotative movement of one-half a graduation to the counter disk 18. Fig. 2 shows in full lines the position of the crank 8 at the beginning of this camming operation on one of the pins 17, and in broken lines the position of the crank and the cammed pin and two of the graduation numerals (1 and 7) at the end of this first camming operation.

Figure 3:
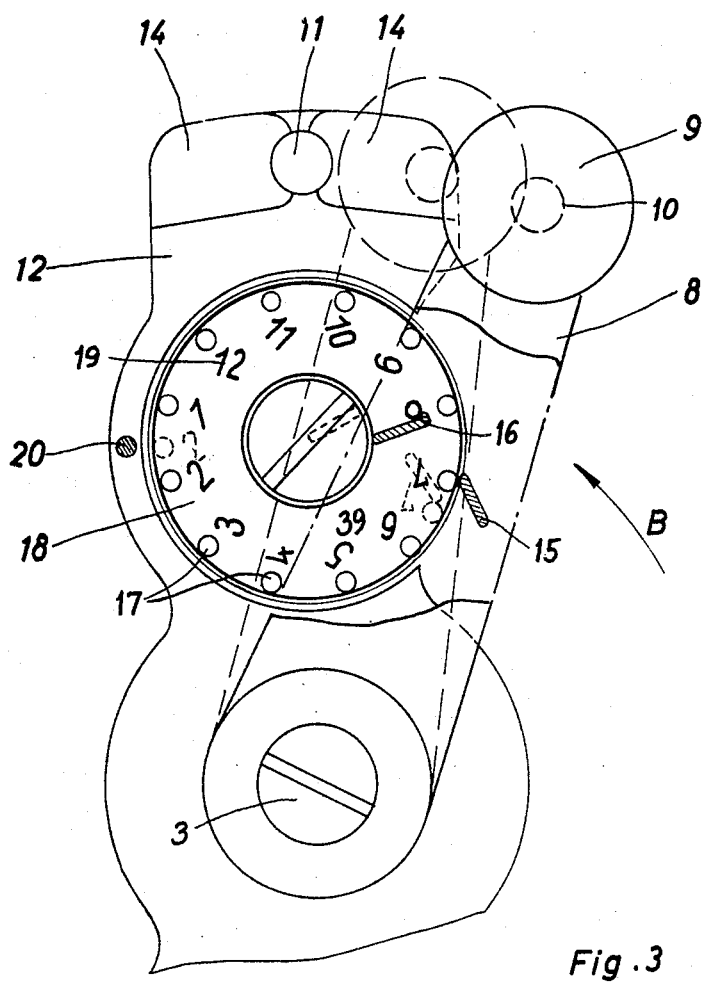
Fig. 3 is a view similar to that of Fig. 2 showing the relative positions of the elements during the second step operation of the housing film winding means.

In this type of camera, it is necessary to return the film winding crank to its rest or initial position, before the shutter can be tripped to make the next exposure. As the crank 8 is returned counterclockwise toward rest position by movement in the direction of arrow B in Fig. 3, the lower surface of the camming projection 15 contacts the periphery of the same one of the counter disks pins 17, moving the same downwardly and rotating the disk 18 clockwise a distance equal to one-half a scale graduation. In Fig. 3, the parts are shown in full lines in their positions just as the cam 15 comes into contact with the pin 17 and begins to move it, and are shown in broken lines at the completion of such movement. In rest setting, the crank 8 again assumes the position shown in Fig. 1, with the stud 10 retained in the bore 11 and the projection 16 in position to engage a new disk pin 17.

A comparison of Figs. 2 and 3 clearly shows that each swing of the crank 8 in either direction rotates the disk 18 one-half of a scale graduation and therefore a new graduation is located opposite the index 20 after each complete clockwise and counterclockwise movement of the crank 8. Since the movement of the crank 8 is directly transmitted to the camera winding handle 6 through the shaft 3 and lever 4, the crank 8 and lever 4 move through the same arcuate distance. The crank 8, the shaft 3, and the lever 4 therefore enable the normal shutter tensioning and film feeding means of the camera to be operated from outside the waterproof housing without modification of the camera structure, and at the same time the operator is provided with an auxiliary counter which is synchronized with and more readily readable than that of the camera.

As seen in Fig. 1, there may be brake shoes 41 placed behind the counter disk 18 and pressed lightly against the inner face of the disk by resilient block 43 of rubber or the like, thus forming a friction brake to hold the disk 18 against accidental turning.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. In a protective water-tight housing for use in enclosing a camera having exposure counter means, the combination of a visible exposure counter carried by said housing and operating means for actuating the exposure counter of said housing in synchronism with that of an enclosed camera, said operating means including a rotatable shaft extending through a wall of said housing, a lever secured to the end of said shaft within said housing and adapted to be operatively connected to the exposure counter means of an enclosed camera, and a crank secured to the opposite end of said shaft for rotating said lever through said shaft to actuate the exposure counter means of an enclosed camera, said exposure counter of said housing including a rotatable graduated counter disk mounted between said crank and said housing, an index mark located adjacent said disk and fixed relative thereto, a plurality of pins extending outwardly from said disk toward said crank, first cam means fixed to said crank adjacent said disk for engaging and moving one of said pins and disk during rotation of said crank and lever in one direction, and second cam means fixed to said crank for engaging and moving one of said pins and disk during rotation of said crank and lever in a direction opposite to said first mentioned direction, each of said movements of said pin being in the same direction and equal to one-half the arcuate distance between disk graduations whereby a new disk graduation is positioned opposite said index mark after movement of said disk by first and second cam means.

2. A construction as defined in claim 1, wherein said housing is provided with means for holding said disk in fixed position after rotation thereof by said crank.

3. A construction as defined in claim 1, wherein said housing is provided with locking means for maintaining said crank in rest position after rotation thereof, said locking means including a plate secured to said housing between said crank and housing, a stud fixed to said crank and adapted to engage within a bore in said plate, and cam means adjacent said bore and lying in the path of said stud as said crank is rotated, said crank being flexible in a direction approximately parallel to said shaft whereby rotation of said crank toward said bore causes said cam means to displace said stud away from said housing until said stud reaches said bore whereupon said flexible crank resiliently urges said stud into said bore for maintaining said crank fixed against accidental movement thereof.

4. In a protective water-tight housing for use in enclosing a camera having exposure counter means, the combination of a visible exposure counter carried by said housing and operating means for actuating the exposure counter of said housing in synchronism with that of an enclosed camera, said operating means including a rotatable member extending through a wall of said housing and adapted to have its portion within said housing operatively connected with the exposure counter means of an enclosed camera, and a manipulating member secured to said rotatable member outwardly of said housing for moving said rotatable member, said exposure counter of said housing including a plurality of cooperating elements on said housing and manipulating member, one of said elements being a rotatable graduated disk having cam engaging parts, and another of said elements including camming means adapted to contact with and move said cam engaging parts of said disk whereby movement of said manipulating member in one direction relative to said housing causes a portion of said camming means to contact and move a cam engaging part and said disk and movement of said manipulating member in a reverse direction enables another portion of said camming means to cause a like movement of said cam engaging part and disk, with each movement of said disk being equal to one-half the distance between graduations on said disk.

5. A construction as defined in claim 4, wherein said disk is rotatably mounted on said housing and said camming means is fixed to said manipulating member.

6. A construction as defined in claim 5, wherein said cam engaging parts includes a plurality of pins secured to said disk, with each pin being located adjacent a graduation on said disk, and said camming means includes a pair of cam projections one of which engages a disk pin during clockwise movement of the manipulating member and the other of which engages the same disk pin during counterclockwise movement of the manipulating member.

7. In a protective water-tight housing for use in submarine photography with a camera of the type having a rotary film winding member rotatable from a rest position first in one direction and then in an opposite direction back to its rest position for winding film for each successive exposure, said housing including a wall, the combination of a shaft extending through said wall in water-tight relation thereto, means operatively connected to said shaft within said housing for engaging the film winding member of a camera within the housing to turn said film winding member from said shaft, a manipulating member accessible externally of said housing and operatively connected to said shaft to turn the same, cooperating detent means on said housing and said manipulating member for indicating when said manipulating member is in a rest position corresponding to the rest position of the film winding member of the camera, graduated counter means mounted externally on said housing, and coacting means on said counter means and said manipulating member effective upon movement of said manipulating member away from and back to its rest position for advancing said counter means step by step.

References Cited in the file of this patent

UNITED STATES PATENTS

| | | |
|---|---|---|
| 277,980 | Blodgett | May 22, 1883 |
| 1,535,312 | Hosking | Apr. 28, 1925 |
| 2,573,885 | Whitman et al. | Nov. 6, 1951 |

FOREIGN PATENTS

| | | |
|---|---|---|
| 617,969 | France | Nov. 30, 1926 |
| 690,464 | France | June 17, 1930 |